(12) United States Patent
Bender et al.

(10) Patent No.: US 7,000,546 B1
(45) Date of Patent: Feb. 21, 2006

(54) UNDERWATER MINE COUNTERMEASURE WARFARE SYSTEM

(75) Inventors: Gregory Louis Bender, Metairie, LA (US); James A. Gleason, Waveland, MS (US)

(73) Assignee: Textron Inc., Providence, RI (US)

( * ) Notice: Subject to any disclaimer, the term of this patent is extended or adjusted under 35 U.S.C. 154(b) by 1826 days.

(21) Appl. No.: 07/981,237

(22) Filed: Nov. 25, 1992

(51) Int. Cl.
*B63G 7/06* (2006.01)

(52) U.S. Cl. ...................... 102/402; 89/1.13

(58) Field of Classification Search ............... 102/402, 102/403; 89/1.13, 1.11; 180/116, 126, 127, 180/124
See application file for complete search history.

(56) References Cited

U.S. PATENT DOCUMENTS

| | | | | |
|---|---|---|---|---|
| 3,583,520 A | * | 6/1971 | Kirpitznikoff | 180/127 |
| 3,826,215 A | * | 7/1974 | Dyjak | 102/402 |
| 3,939,753 A | * | 2/1976 | Rosborough et al. | 102/402 |
| 3,946,696 A | * | 3/1976 | Lubnow | 89/1.13 |
| 4,220,108 A | * | 9/1980 | Burt | 102/402 |
| 4,397,366 A | * | 8/1983 | Eldridge et al. | 180/116 |
| 4,821,829 A | * | 4/1989 | Gilbert et al. | 180/127 |
| 4,938,136 A | * | 7/1990 | Gould | 102/402 |
| 4,993,325 A | * | 2/1991 | Slone et al. | 102/402 |
| 5,125,317 A | * | 6/1992 | Spektor et al. | 89/1.13 |

* cited by examiner

*Primary Examiner*—Michael J. Carone
(74) *Attorney, Agent, or Firm*—Perman & Green, LLP

(57) ABSTRACT

An underwater mine warfare countermeasure system is disclosed in which an air cushion vehicle carries a magnetic field generating system capable of generating a magnetic field pattern beneath the vehicle which extends sufficiently far from the vehicle in all directions to activate a magnetically responsive detonator in a mine while the vehicle is out of range of the explosive force of the mine. The magnetic field generating system generally is composed of a plurality of closed loop coils mounted on the deck of the vehicle, one coil being horizontal and in the plane of the deck, and another three being in vertical planes spaced along the length of the vehicle.

2 Claims, 4 Drawing Sheets

UNDERWATER MINE COUNTERMEASURE WARFARE SYSTEM

BACKGROUND OF THE INVENTION

This invention relates generally to the field of underwater mine countermeasure warfare, and more particularly to an underwater mine countermeasure warfare system utilizing an air cushion vehicle equipped with a magnetic sweep generator capable of emitting a magnetic field pattern for exploding submerged mines having magnetic field responsive detonators.

It has long been well known in the field of both land and sea warfare to set mines in strategic locations which will explode at an appropriate moment to destroy vehicles and land vehicles which are within the explosive range of the mines. In addition to mere contact between a vehicle and a mine, various techniques have been developed to cause the mines to explode remotely so that the vehicle suffers damage without actually contacting the mine. For example, some mines are provided with acoustically responsive detonators which cause the mines to explode when the detonator detects a predetermined sound wave pattern which simulates the sound pattern of a ship or other vehicle. Another example is mines which are provided with magnetically responsive detonators which cause the mines to explode when the detonator detects a predetermined magnetic field pattern which simulates the magnetic field or signature of an approaching ship. Some mines require a particular orientation and time rate of change of the magnetic field, the acoustic field, or both, before they will explode.

However, with each new technological advance in the sophistication of detonating systems for mines, a countermeasure is soon developed for defeating the effectiveness of a new detonator. This is normally accomplished by devising systems which simulate the condition to which the detonator is responsive so that the mine is caused to explode harmlessly without damage to any nearby vehicles. For example, contact mines can be exploded by dragging various devices along the surface on which the mines are imbedded or floating, as the case may be, by a helicopter. Acoustic mines can be exploded by transmitting a pattern of acoustic waves which simulate the sound pattern of a vehicle or vehicle to which the detonator is responsive, such as the sound pattern emitted by the engines of a ship. Similarly, magnetic mines can be exploded by generating a magnetic field which simulates the magnetic signature of an approaching and or departing vehicle or vehicles. This technique is particularly suitable to exploding underwater mines because large ships emit a distinctive magnetic field pattern because of both the large mass of metal and a variety of equipment which generates various magnetic field patterns. Often mines are designed to explode only after being exposed to a predetermined number of exposures to the critical parameters, which can be conveniently accomplished by an automated system to repetitively generate a field simulating a target ship's approaching or departure pattern.

A major problem with any system for simulating a condition to which a mine is responsive is that of bringing the simulating system into sufficiently close proximity to the mine to cause it to explode without damaging the vehicle used to transport the simulating system. Many solutions to this problem have been put forth from time to time, such as the use of helicopters as mentioned above or slow flying airplanes dragging or towing the condition simulating equipment, and land and sea vehicles equipped with the necessary simulating equipment which can function out of range of the explosive force of the mines.

Prior to the present invention, one solution in particular worked rather effectively as an underwater mine countermeasure system, which is the type of mine warfare with which the present invention is primarily concerned. This solution included a pontoon supported vehicle which could be remotely controlled from another vehicle, and which included apparatus for generating a magnetic field in the water which extended for some considerable distance beyond the vehicle. The magnetic field was generated by a combination of a horizontal loop magnetic coil located on the railing of the vehicle in a plane parallel to the deck of the vehicle. Additionally, four more axial coils were found on two heavy iron pipe cores located in the pontoons of the vehicle. The magnetic field generated by this combination of coils was of sufficient intensity to explode submerged mines having magnetically responsive detonators while the vehicle was still out of range of the explosive force of the mine so that it suffered no damage. Unfortunately, the vehicle could travel at only a moderate speed, thereby impeding its ability to move quickly from one operational location to another; it had very limited maneuverability; and being in the water it was subject to underwater shock from exploding mines and therefore had to be operated at considerable distances from the mines, necessitating very high capacity magnetic field generating equipment.

BRIEF SUMMARY OF THE INVENTION

The present invention substantially alleviates, if not altogether eliminates, the disadvantages of prior known vehicles utilized in mine countermeasure warfare, particular those utilized in underwater mine countermeasure warfare.

The present invention is an underwater mine warfare countermeasure system which includes a water borne vehicle having a platform normally constituting a deck. A magnetic field generating means is mounted on the platform of the vehicle for generating a magnetic field pattern beneath the vehicle which is of sufficient magnitude and extends sufficiently far from the vehicle in all directions to activate a magnetically responsive detonator in a mine while the vehicle remains out of range of the explosive force of the mine.

In the presently preferred embodiment of the invention, the magnetic field generating means comprises a plurality of closed loop magnetic coils mounted on the platform in planes which are substantially horizontally and vertically oriented with respect to the platform of the air cushion vehicle. In particular, one coil is arranged in a substantially horizontal plane and is generally contiguous with the periphery of the platform. Three additional coils are mounted on the platform in upstanding rectangular frames and are spaced apart so as to lie in planes which are substantially perpendicular to the plane of the first coil and are parallel to each other.

Although not essential to the practice of the present invention, it is preferred that the water borne vehicle be of the air cushion type, which has a platform, a blower system mounted on the platform for discharging air into an air chamber located beneath the platform, an air retaining skirt attached to and surrounding the platform for retaining a cushion of air in the air chamber at sufficient pressure to support the vehicle above the surface on which it normally rests, and means mounted on the platform for propelling the vehicle in a given direction when the vehicle is supported by the cushion of air.

Several significant advantages are offered by the use of an air cushion vehicle over a flotation vehicle, whether of single or of multiple hull construction, such as greater maneuverability and speed, and, most importantly, the relative insensitivity of an air cushion vehicle to underwater shock. Relative high speeds in the order of 45 knots afford greatly decreased transit times in relocating from one operational zone to another, and the ability to operate in high seas further adds to the operational flexibility of the vehicle.

One critical operational requirement of an air cushion vehicle is that of avoiding any and all unnecessary weight. Since the vehicle is supported on a cushion of air beneath the platform, the heavier the vehicle becomes, the more difficult it is to generate the pressure required to lift the vehicle from the supporting surface. Thus, as weight is added to a given vehicle, more powerful and larger capacity lift engines and blowers are required to generate the necessary pressure, thereby rendering the vehicle more cumbersome and costly to operate.

In order to obtain full benefit of the advantages of an air cushion vehicle, it is necessary to have a magnetic field generating means which is both light in weight and yet capable of generating the maximum field strength possible. By eliminating the axial coils used in the predecessor vehicle, the heavy iron pipe cores are no longer required, thereby substantially reducing the weight of the improved coil system. In addition, the new coil configuration provides an increased magnetic field intensity due to the area within the rectangular frames, thereby enabling larger ships to be simulated and a wider lane to be swept. In addition, the maintainability of the system is greatly enhanced because all components are either on or above the platform of the vehicle. Further, since the coils can easily be removed, the vehicle is more adaptable for use in alternate missions.

Having briefly described the general nature of the present invention, it is a principal object thereof to provide an underwater mine warfare countermeasure system which effectively alleviates or eliminates the disadvantages of prior known under water mine warfare countermeasure systems, while at the same time retaining the significant advantages thereof.

Another object of the present invention is to provide an underwater mine warfare countermeasure system which utilizes a water borne vehicle, preferably an air cushion vehicle, as the primary support vehicle for a system which explodes submerged mines without damage to the support vehicle.

Still another object of the present invention is to provide an underwater mine warfare countermeasure system in which a magnetic field generating means is provided which is designed to have the least amount of weight possible for the size and strength of the magnetic field generated.

These and other objects and advantages of the invention will become more apparent from an understanding of the following detailed description of a presently preferred embodiment of the invention, when considered in conjunction with the accompanying drawings.

DETAILED DESCRIPTION OF THE PREFERRED EMBODIMENT

Figure 1:
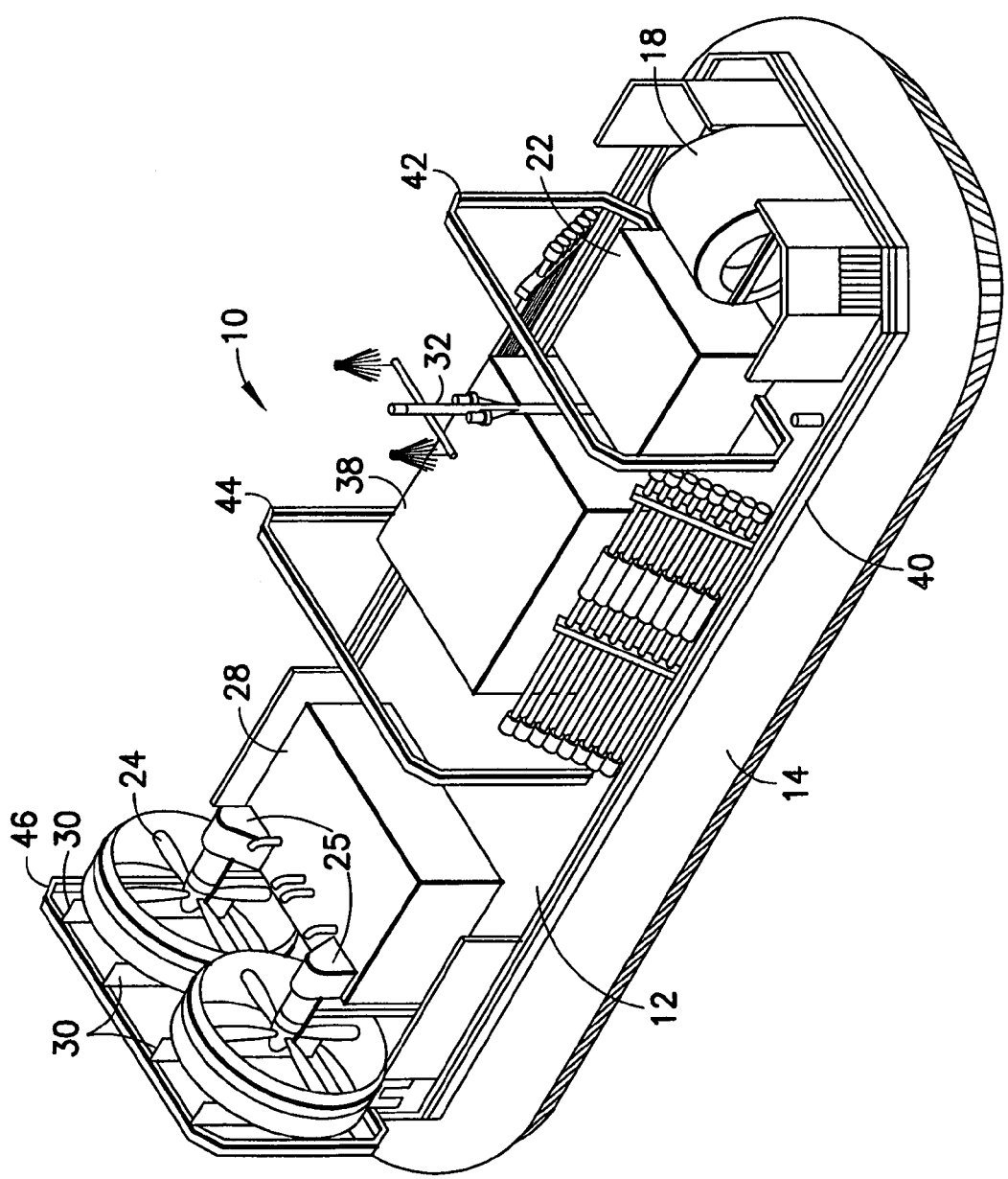
FIG. 1 is a perspective view of an air cushion vehicle incorporating the present invention.
Figure 2:
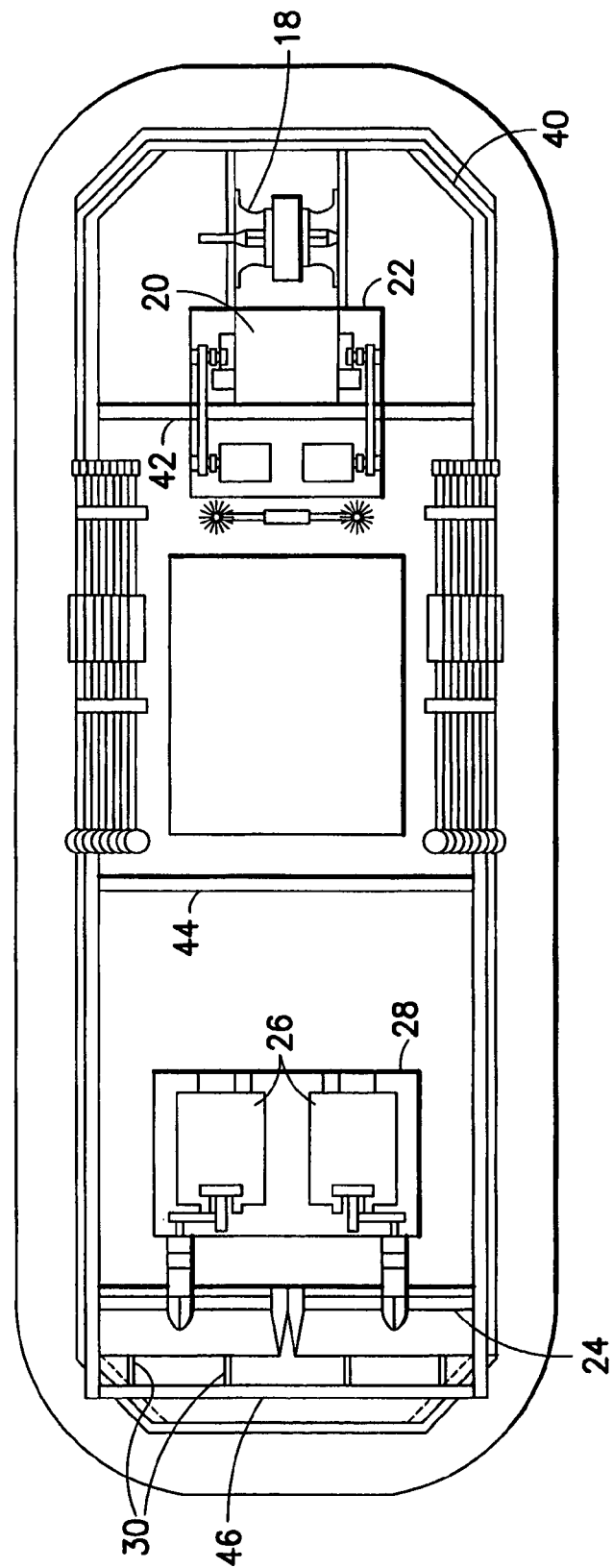
FIG. 2 is a plan view of the air cushion vehicle shown in FIG. 1.
Figure 3:
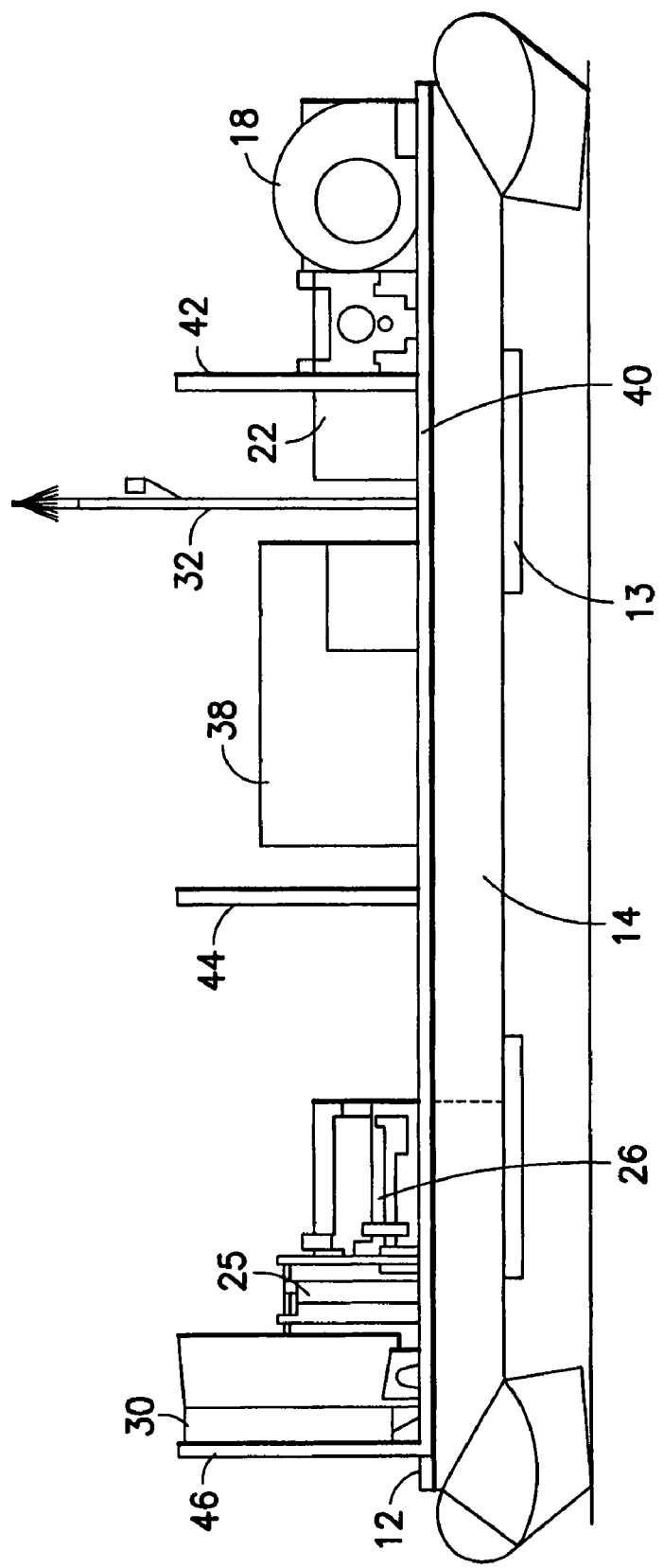
FIG. 3 is a side view of the air cushion vehicle shown in FIG. 1.

Referring now to the drawings, and particularly to FIGS. 1 through 4 thereof, the invention comprises a remotely controlled air cushion vehicle generally designated by the reference numeral 10, although as indicated above a flotation type vehicle could be substituted for the air cushion vehicle disclosed. The vehicle 10 is shown somewhat generally for illustrative purposes only and only those details of the vehicle which are necessary to an understanding of the invention are shown and described. Thus, the vehicle 10 comprises a platform 12 supported on a suitable hull 13 which constitutes the main structural hull of the vehicle. A peripheral skirt system 14 consisting of a bag of neoprene-coated nylon fabric is attached to the periphery of the platform 12 and extends downwardly therefrom to form an air chamber (not shown) between the underside of the platform 12 and any surface on which the vehicle is resting or over which it is traveling. The skirt system 14 provides a low drag interface with the surface at all speeds, whether over water, hard surfaces, or marsh, and lifts the vehicle high enough to provide obstacle clearances in rough terrain. It also provides pitch and roll stability to contribute to a good ride and avoid a plow-in condition.

Although several variations exist, the air cushion vehicle also includes a blower system which is designed to blow air downwardly through openings in the platform 12 to create an air cushion in the chamber 16 which has sufficient pressure to raise the vehicle above the surface on which it is resting. Thus, in the illustrated vehicle, a blower assembly 18 is mounted on the platform 12 in any suitable location and is driven by a suitable engine 20 mounted on the platform 12 within the housing 22 so as to blow a large volume of air downwardly, either directly through a large opening in the platform 12 or through an air distribution system within the platform 12 and skirt system 14 which distributes the air more uniformly than does a single large opening.

The vehicle is propelled in a forward direction by one or more propellers 24 mounted on supports 25 adjacent the rear end of the platform 12, the propellers being driven by any suitable engines 26 located within the housing 28. A plurality of aerodynamic rudders or vanes 30 are mounted rearwardly of the propellers and are pivotable about a vertical axis so as to direct the air stream from the propellers 22 toward either side of the vehicle for the purpose of steering the vehicle in either left or right directions. Finally, the vehicle 10 is provided with a suitable antenna 32 by which the vehicle 10 receives control signals 34 (FIG. 4) from a remote control vehicle generally designated by the numeral 36. The control components for operating all of the systems on the air cushion vehicle are located in the housing 38.

As best seen in FIG. 1, the magnetic field generating means comprises a plurality of magnetic coils forming large closed loops mounted on the upper surface of the platform 12. For purposes of illustration the coils are shown to be rectangular in configuration, although other configurations are acceptable; the key factor is the area inside the coil and the number of loops of wire within each coil. As seen, one coil is disposed substantially in the plane of the platform 12 and the others are disposed in substantially vertical parallel planes spaced out along the length of the vehicle. Thus, one coil 40 is oriented substantially in the plane of the platform 12 and follows the peripheral edge of the platform. A second coil 42 is oriented in a substantially vertical plane perpendicular to the centerline of the vehicle and is located in the region of the housing 22 surrounding the lift engine 20. A third coil 44 is oriented in a substantially vertical plane parallel to the plane of the coil 42 and is located substantially approximately in the middle of the vehicle 10. Finally, a fourth coil 46 is oriented in a substantially vertical plane parallel to the planes of the coils 42 and 44 and is located just to the rear of the propellers 24. The reason for this orientation is to permit the magnetic field to be focused sufficiently far ahead of the vehicle 10 to avoid detonating the mine under the vehicle or even sufficiently close thereto to cause damage to it. All of the coils are surrounded by an aluminum enclosure to prevent movement of the multiple loops of fine wire and to protect the loops of wire from environmental effects.

In a representative situation, the first coil encloses an area of approximately 85 $m^2$, and consists of 14 turns of cable in seven groups connected in parallel. The other three coils 42, 44 and 46 enclose an area of approximately 14.4 $m^2$, and consist of 40 turns of cable in eight groups connected in parallel. The total weight of the magnetic coils is 6065 lbs. The coils are powered at 230 volts with the coil 40 requiring 16 Kwangtung and each of the vertical coils 42, 44 and 46 requiring 14 Kwangtung for a total power requirement of 58 Kwangtung. Power for the coils is preferably provided by two electrical generators, belt-driven from the lift engine 20. Suitable electronic controls are provided to generate time-phased signals to control the magnetic sweep pattern.

Figure 4:
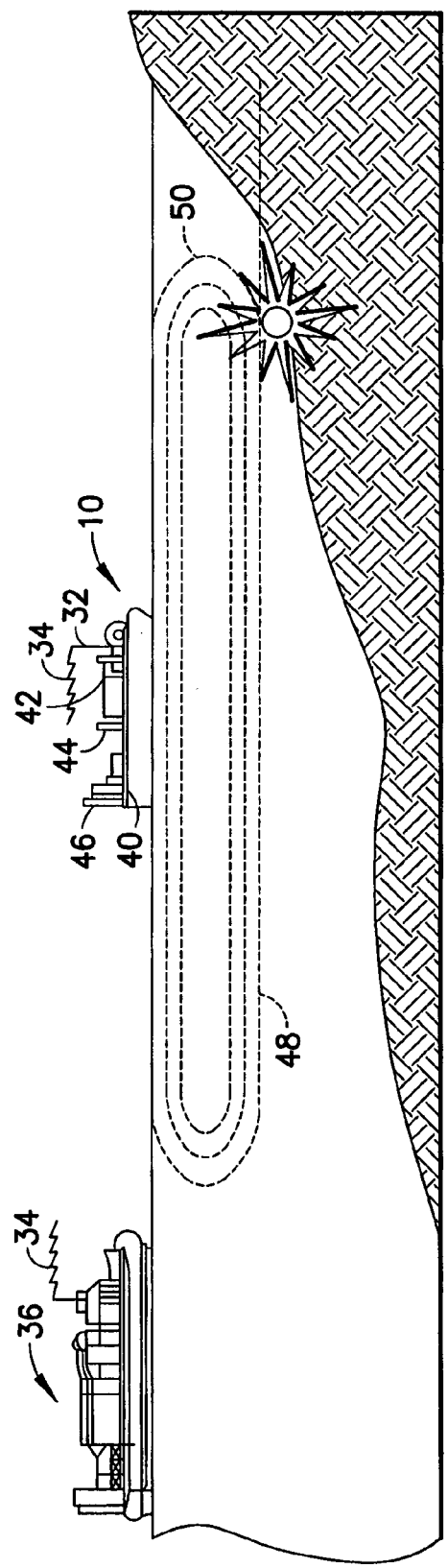
FIG. 4 is an illustration of the manner in which the air cushion vehicle is controlled remotely from a control vehicle, and shows a magnetic wave pattern being generated to explode mines.

FIG. 4 illustrates the manner in which the present invention operates. The air cushion vehicle 10 is controlled remotely from the control vehicle 36 by the signals 34 picked up by the antenna 32 of the vehicle 10. When the vehicle is in the desired location, the coils 40–46 are energized to emit a selected magnetic wave pattern, designated by the lines 48, which extends sufficiently far in advance of the vehicle to detonate the submerged mine 50 while the vehicle 10 is still out of range of the explosive force of the mine. The general shape of the field pattern 48 is as shown in the drawings, but it is also mirrored above the surface of the water. The precise shape of the field pattern is difficult to describe and show since it varies with the time of duration of the time-phased signals and with the specific ship type that is being emulated.

The coil configuration described above provides an increased magnetic field intensity of 50% over the coil arrangement in the pontoon supported vessel described above, enabling larger ships to be simulated and a wider lane to be swept. The coils will be capable of generating a magnetic field with a minimum strength of 100 nT on the sea floor, covering a swath that is 150 meters wide in a range of water depths from 10 to 60 meters. The significance of these characteristics is that the vehicle of the present invention is capable of generating a magnetic field that is 50% wider and deeper than the pontoon supported craft described above, can emulate a larger ship and can provide a wider cleared channel.

What is claimed is:

1. An underwater mine warfare countermeasure system comprising:
    a water borne vehicle having a relatively flat platform thereon; and
    magnetic field generating means comprising a plurality of closed loop magnetic coils disposed in substantially horizontal and vertical planes, mounted on said platform for generating a magnetic field pattern beneath said vehicle of sufficient magnitude to extend sufficiently far from said vehicle in all directions to activate a magnetically responsive detonator in a mine while said vehicle remains out of range of the explosive force of the mine, said plurality of coils comprising a first coil oriented substantially in the plane of said platform and following the peripheral edge of said platform, a second coil oriented in a substantially vertical plane substantially perpendicular to the centerline of said vehicle and disposed adjacent the forward end of said vehicle, a third coil oriented in a substantially vertical plane substantially parallel to the plane of said second coil and located substantially at the midpoint of said vehicle, and a fourth coil oriented substantially in a vertical plane substantially parallel to the planes of said second and third coils and located adjacent the rear end of said vehicle.

2. An underwater mine warfare countermeasure system comprising:
    an air cushion vehicle having:
    a platform;
    means mounted on said platform for discharging air into an air chamber located beneath said platform;
    an air retaining skirt attached to and surrounding said platform for retaining a cushion of air in said air chamber at sufficient pressure to support the vehicle above the surface of the water; and
    means mounted on said platform for propelling the vehicle in a given direction when the vehicle is supported by the cushion of air; and
    magnetic field generating means comprising a plurality of closed loop magnetic coils disposed in horizontal and vertical planes mounted on said platform for generating a magnetic field pattern beneath said vehicle of sufficient magnitude to extend sufficiently far from said vehicle in all directions to activate a magnetically responsive detonator in a mine while said vehicle remains out of range of the explosive force of the mine, said plurality of coils comprising a first coil oriented substantially in the plane of said platform and following the peripheral edge of said platform, a second coil oriented in a substantially vertical plane substantially perpendicular to the centerline of said vehicle and disposed adjacent the forward end of said vehicle, a third coil oriented in a substantially vertical plane substantially parallel to the plane of said second coil and located substantially at the midpoint of said vehicle, and a fourth coil oriented substantially in a vertical plane substantially parallel to the planes of said second and third coils and located adjacent to the rear end of said vehicle.

* * * * *